(12) United States Patent
Lin

(10) Patent No.: US 8,302,257 B2
(45) Date of Patent: Nov. 6, 2012

(54) DOUBLE-PEDAL DOUBLE-WHEEL TRUCKLE WITH INDEPENDENT BRAKING AND RELEASING FUNCTIONS

(75) Inventor: Qing-Song Lin, Douliou (TW)

(73) Assignee: Catis Pacific Mfg. Corp. Ltd., Yunlin County (TW)

( * ) Notice: Subject to any disclaimer, the term of this patent is extended or adjusted under 35 U.S.C. 154(b) by 426 days.

(21) Appl. No.: 12/701,646

(22) Filed: Feb. 8, 2010

(65) Prior Publication Data

US 2010/0170061 A1 Jul. 8, 2010

Related U.S. Application Data

(63) Continuation-in-part of application No. 11/862,637, filed on Sep. 27, 2007, now abandoned.

(51) Int. Cl.
*B60B 33/00* (2006.01)
(52) U.S. Cl. .................... 16/35 R; 16/47; 16/48
(58) Field of Classification Search .......... 16/18 R, 16/45, 46, 47, 48, 20, 35 R, 35 D; 188/1.12, 188/1.11 R
See application file for complete search history.

(56) References Cited

U.S. PATENT DOCUMENTS

| 4,035,864 | A | * | 7/1977 | Schroder | 16/35 R |
| 4,706,328 | A | * | 11/1987 | Broeske | 16/35 R |
| 4,941,552 | A | * | 7/1990 | Screen | 16/35 R |
| 5,988,323 | A | * | 11/1999 | Chu | 16/35 R |
| 6,425,797 | B1 | * | 7/2002 | Wu | 16/35 R |
| 6,532,624 | B1 | * | 3/2003 | Yang | 16/35 R |

FOREIGN PATENT DOCUMENTS

| EP | 431247 A1 | * | 6/1991 |
| JP | 05310004 A | * | 11/1993 |
| JP | 05310005 A | * | 11/1993 |
| JP | 06016002 A | * | 1/1994 |
| TW | 339043 B2 | | 8/1998 |

* cited by examiner

*Primary Examiner* — Jeffrey O Brien

(57) ABSTRACT

A double-pedal double-wheel truckle with independent braking and releasing functions is a truckle for a precision instrument and comprises a body, a rotating & locking device, a truckle body device, a braking device and a bottom cover body. The body is provided for disposing a rotating & locking device, a truckle body device, a braking device and a bottom cover body. With the independent braking and releasing functions of the braking device of the body, the user can easily operate and stably block the rotating & locking device and the truckle body device. The bottom cover body is provided for preventing foreign matters from entering the truckle body device, so that the truckle can be locked from rotation. By such arrangements, it can achieve the objectives, such as easy operation, easy to distinguish braking state, stable braking, reducing noises, strengthening structure and safe usage, etc.

3 Claims, 5 Drawing Sheets

DOUBLE-PEDAL DOUBLE-WHEEL TRUCKLE WITH INDEPENDENT BRAKING AND RELEASING FUNCTIONS

This application is a continuation of part of U.S. patent application Ser. No. 11/862,637, now abandoned which claims the benefit of the earlier filing date of Sep. 27, 2007. Claims 1-7 of this application correspond to the claims 1-7 of the U.S. patent application Ser. No. 11/862,637, claims 8-14 of this application correspond to claims 14-20 of the U.S. patent application Ser. No. 11/862,637, respectively.

BACKGROUND OF THE INVENTION

1. Field of the Invention

The present invention relates to a truckle with braking and releasing functions, and more particularly to a truckle with independent braking and releasing functions suitable for a precision instrument, which utilizes a braking device to provide the user the functions, such as easy operation, easy to distinguish the braking state, stable braking, avoiding noises and safe usage, etc.

2. Description of the Prior Art

A conventional truckle structure disclosed in Taiwan Design Patent No. 339,043 is an improvement of a truckle structure. On the top of the truckle rack of this truckle structure is disposed a holding platform. A braking device is suspended from the front end of the holding platform. The holding platform includes opposite through holes in both side boards thereof, at least one pivot hole in the protruding ear at the front end of each side board, at least one fastening portion inside each side board adjacent to the protruding ear. The fastening portion includes a longitudinal end board forming on the inside surface of the side board adjacent to the protruding ear. The tip end of the longitudinal end board extends backward out of a side stopping board. A transverse engaging block is disposed in a region surrounded by the longitudinal end board and the side stopping board. In addition, a fastener is disposed on the side board.

The above conventional truckle structure has the following disadvantages:

1. Difficult to operate: the braking structure of the braking device is integrated with the releasing structure. By such a design, the braking operation and the releasing operation cannot be substantially achieved. Thereby, it cannot provide an easy operation and high safety;

2. Cost wasting: the braking device is suspended from the front end of the holding platform, and such a design is a two-segment design and is unlikely to be an integrated structure, so it is required to additionally manufacture the braking component after the holding platform is completed, thus increasing a manufacturing process and causing the material waste;

3. Difficult to manufacture: On the top of the truckle rack is disposed a holding platform. The holding platform includes opposite through holes in both side boards thereof, at least one pivot hole in the protruding ear at the front end of each side board, at least one fastening portion inside each side board adjacent to the protruding ear and a longitudinal end board forming on the inside surface of the side board adjacent to the protruding ear. The tip end of the longitudinal end board extends backward out of a side stopping board. In a region surrounded by the longitudinal end board and the side stopping board is disposed a transverse engaging block. The highly complicated side board is difficult to manufacture.

4. Truckle deformation: since the braking device of the holding platform directly presses against the truckle body and a pivot rotating position, such a braking action is likely to cause the deformation of the truckle body.

5. Easy damage: on the top of the truckle are disposed a holding platform and the side boards of the holding platform, etc, so the assembled truckle rack needs to support the structures of the holding platform, etc, thus improving the damage rate of the truckle rack.

6. Poor stability: the braking structure is integrated with the releasing structure of the braking device, by such a design, when in use, the user is likely to synchronously perform the braking action and the releasing action, thus causing the poor operational stability.

The present invention has arisen to mitigate and/or obviate the afore-described disadvantages.

SUMMARY OF THE INVENTION

The present invention relates to a double-pedal double-wheel truckle with independent braking and releasing functions. The truckle is suitable for a precision instrument and comprises a body. The braking device is disposed in the middle of the rotating & locking device and the truckle body device. With the above integral structure, it can achieve the objectives of easy operation, easy to distinguish the braking state, stable braking, reducing noises, strengthening structure and safe usage, etc.

The present invention further relates to a double-pedal double-wheel truckle with independent braking and releasing functions. The truckle is suitable for a precision instrument and comprises a body. With the braking and releasing functions of a braking device of the body, the rotating & locking device and the truckle body device can be firmly positioned, and the user can easily distinguish the braking state, operate and stably block the truckle through the braking device, so as to keep the truckle suitable for the precision instrument in a safe locked state, thus achieving the objectives of easy operation, easy to distinguish the braking state, stable braking and safe usage, etc.

DETAILED DESCRIPTION OF THE PREFERRED EMBODIMENTS

Figure 1:
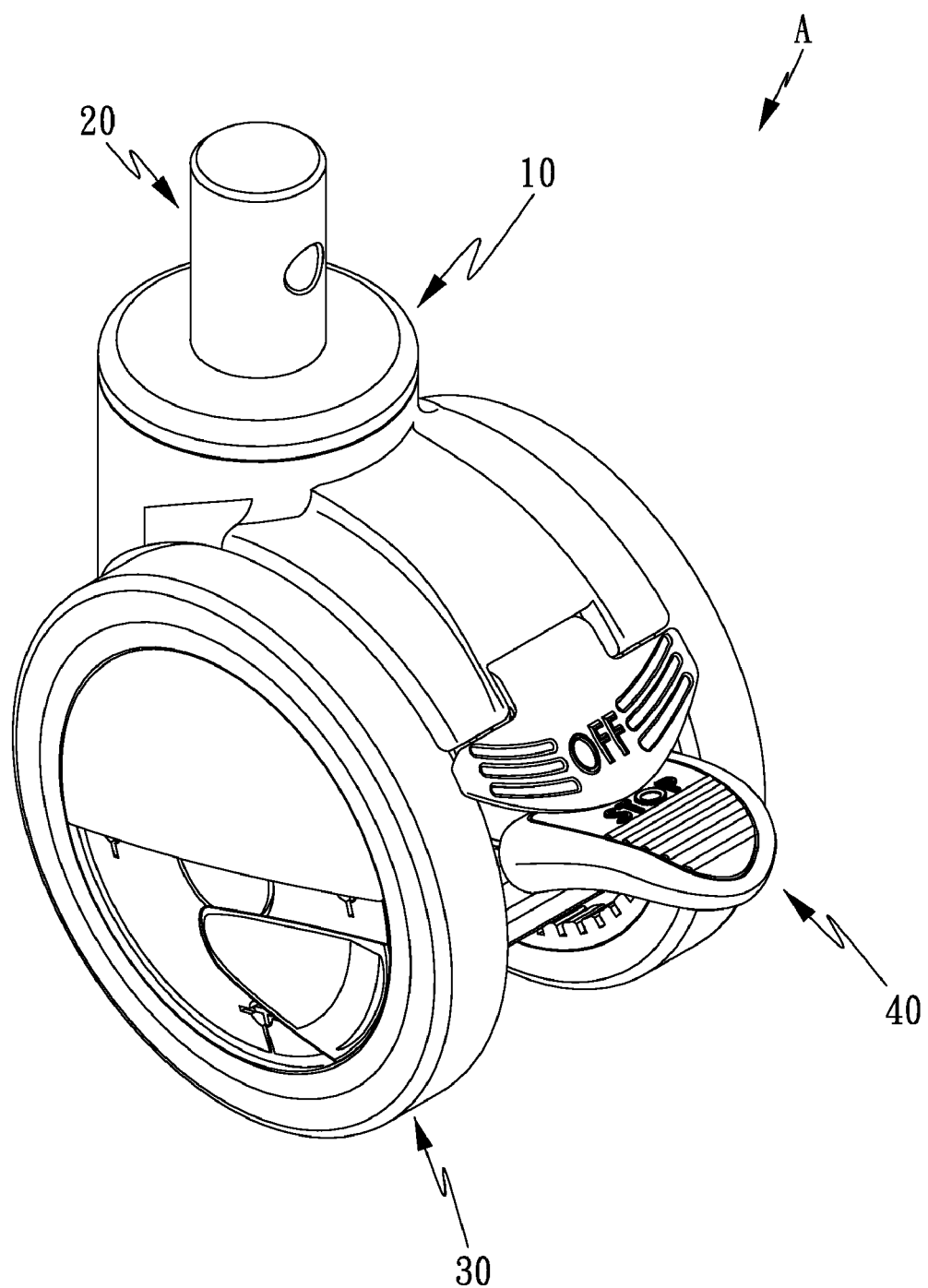
FIG. 1 is a perspective view of a double-pedal double-wheel truckle with independent braking and releasing functions in accordance with the present invention.

The present invention will be clearer from the following description when viewed together with the accompanying drawings, which show, for purpose of illustrations only, the preferred embodiment in accordance with the present invention.

Referring to FIGS. 1-5, a double-pedal double-wheel truckle A with independent braking and releasing functions in accordance with the present invention, which is suitable for a precision instrument, comprises a-body 10. The body 10 includes a rotating & locking device 20, a truckle body device 30, a braking device 40 and a bottom cover body 50. The braking device 40 is disposed between the rotating & locking device 20 and the truckle device 30 of the body 10. The bottom cover body 50 is disposed at one end of the rotating & locking device 20 and the truckle body device 30 for preventing foreign matters from entering inside. With the braking and releasing functions of the braking device 40 of the body 10, the user can easily operate and stably block the rotating & locking device 20 and the truckle body device 30.

One end of the body 10 is formed with a through round receiving portion 11 of a big diameter for holding the rotating & locking device 20. Adjacent to the receiving portion 11 is disposed a matching body 12 with opposite arc-shaped members. The matching body 12 includes a round receiving hole 120 and a plurality of round through holes 121A, 121B of a small diameter and a plurality of elongated fastening holes 122. The receiving hole 120 is provided for insertion of the truckle body device 30, and the holes 121 A, 121B are provided for the insertion of the braking device 40. The fastening hole 122 is provided for the insertion of the bottom cover body 50.

The rotating and locking device 20 includes a stepped column-shaped inserting member 21, a disc-shaped hollow matching member 22, a round bearing member 23, at least one round hollow washer member 24, a disk-shaped multi-tooth fastening member 25 and a round hollow fixing member 26. One end of the inserting member 21 is fixed to the precision instrument, and the other smaller end of the inserting member 21 is inserted through the matching member 22, the bearing member 23, the washer member 24 and into the fastening member 25. The matching member 22 covers the receiving portion 11 and includes an inserting portion 220 inserted through the center of the bearing member 23. The bearing member 23 is positioned in the receiving portion 11 and a round stepped washer member 24 is located between the bearing member 23 and the fastening member 25. The fastening member 25 includes a cross-shaped receiving hole 250 for receiving the inserting member 21, and a toothed fastening portion 251 for engaging with the braking device 40. The fixing member 26 is fixed to the smaller end of the inserting member 21.

The truckle body device 30 includes at least one pair of round shell members 31, at least one pair of wheels 32, at least one pair of disc-shaped multi-level driven members 33, at least one pair of round bearing members 34 and a solid column-shaped middle shaft 36. The shell member 31 is vertically formed with at least one round protruding engaging portion 310 with a cross groove. The protruding engaging portion 310 is disposed in the driven member 33. Additionally, the wheel 32 is rotatably mounted on the driven member 33. The driven member 33 includes a plurality of engaging holes 330 for engaging with the protruding engaging portions 310 of the shell member 31, a plurality of toothed engaging portions 331 formed around an inner surface of the driven member 33, and a plurality of locking portions 332 formed around an outer periphery of a protruding flange 334 around a central hole 333 of the driven member 33. The engaging portions 331 and the locking portion 332 are provided for engaging with the braking device 40. In addition, the bearing members 34 are located at both sides of the matching body 12 and positioned in the central holes 333 of the driven members 33. The middle shaft 36 is inserted through the matching body 12 and the bearing member 34.

The braking device 40 includes a mushroom-shaped releasing member 41, a L-shaped actuating member 42 and a flexuous chip-shaped releasing & stopping member 43. One end of the releasing member 41 is formed with a releasing portion 410 on which being formed a plurality of symmetrical parallel antiskid ribs, and the other end of the releasing member 41 is folded 90 degrees and formed at the folded portion thereof with a through connecting hole 411 which is pivoted to the holes 121B of the matching body 12 by a pivot 411A inserting through the through connecting hole 411 of the releasing member 41 and the holes 121A of the matching body 12. Furthermore, the folded end of the releasing member 41 is pivotally linked to the actuating member 42 by a pivot shaft 412, and on the surface of the folded end of the releasing member 41 is formed a protruding stop portion 413. One end of the actuating member 42 includes a plurality of through coupling holes 420A, 420B, and the other end of the actuating member 42 includes an actuating portion 421 with a plurality of antiskid parallel ribs. The through coupling holes 420A and the through connecting hole 411 of the releasing member 41 are provided for the insertion of the pivot shaft 412. The through coupling hole 420B is pivotally fixed at one end of the releasing & stopping member 43 by a pivot shaft 420C. A vertical stop portion 422 is formed between two coupling holes 420A.

The releasing & stopping member 43 is formed with two opposite ear-shaped matching portions 430 with a round hole. An arc-shaped elastic return member 431 is formed on an elastic sheet portion between the two opposite matching portions 430 and protrudes in an opposite direction to the matching portions 430. Two fastening portions 432 in the form of through holes are formed at both sides of the elastic sheet portion. Both sides of the elastic sheet portion extend in an opposite direction to the matching portions 430 to form two hook-shaped abutting engaging portions 433. The middle portion of the elastic sheet portion extends in an opposite direction to the matching portions 430 to form an abutting fastening portion 434. At the end of each of two sides of the elastic sheet portion is formed an abutting locking portion 435 which extends in an opposite direction to the matching portions 430.

A pivot shaft 420C is inserted through matching portion 430 and the through coupling hole 420B of the actuating member 42, and the elastic return member 431 is disposed in the middle of the fastening portion 432 to press against the internal surface of the matching body 12. The fastening portion 432 is aligned with the round through hole 121A of the matching body 12 to allow a pivot rod 432A to be inserted in the fastening portion 432 and the hole 121A of the matching body 12. The abutting engaging portions 433, the abutting fastening portion 434 and the abutting locking portions 435 can be selectively engaged with the engaging portion 331 and the locking portion 332 of the driven member 33 of the truckle body device 30 and the fastening portion 251 of the fastening member 25 of the rotating & locking device 20, respectively.

The bottom cover body 50 is an integrated chip body with a plurality of fastening portions 51 to be inserted in the fastening holes 122 of the body 10 to prevent foreign matters from entering the truckle body device 30.

Figure 2:
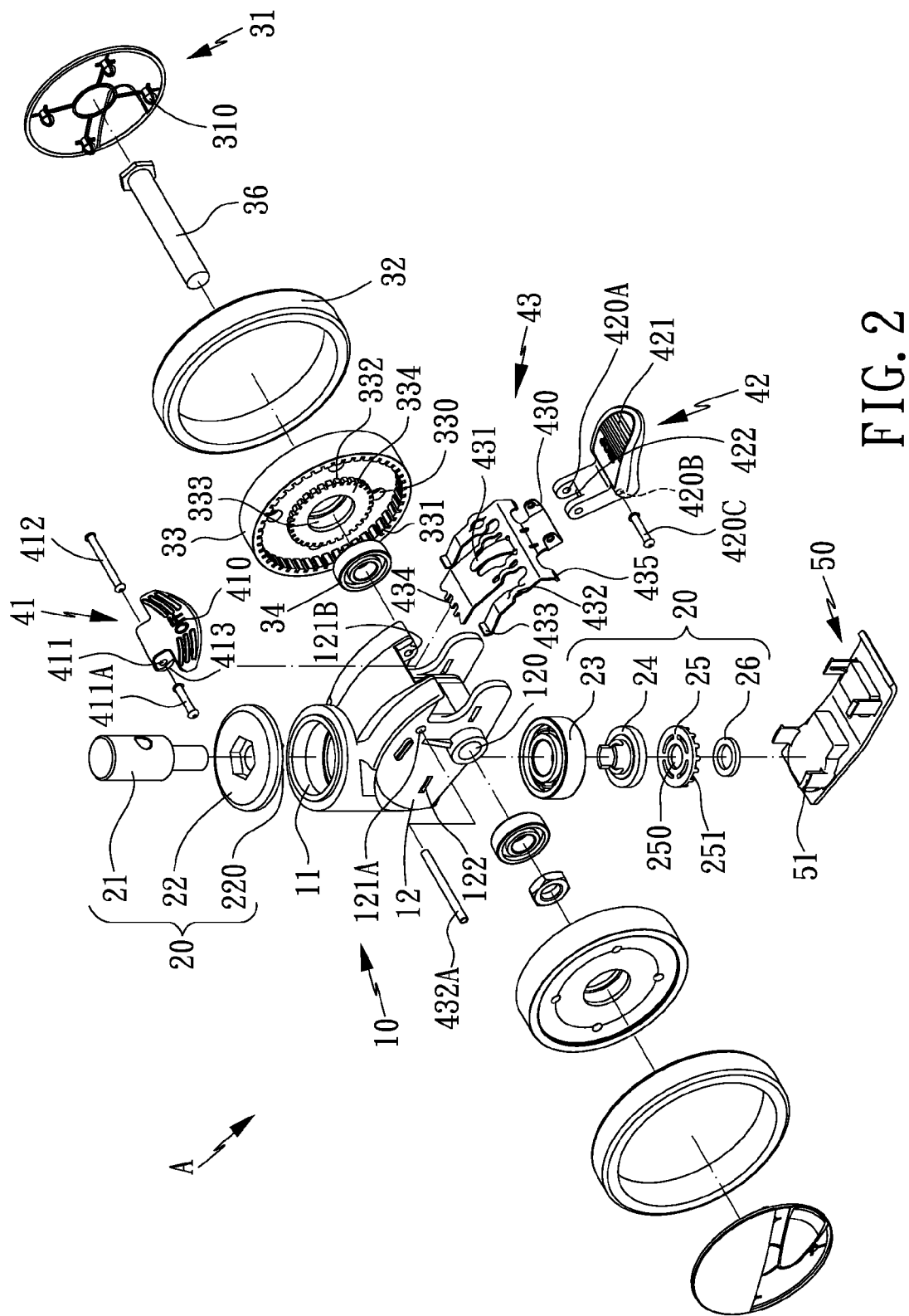
FIG. 2 is an exploded view of the double-pedal double-wheel truckle with independent braking and releasing functions in accordance with the present invention.
Figure 3:
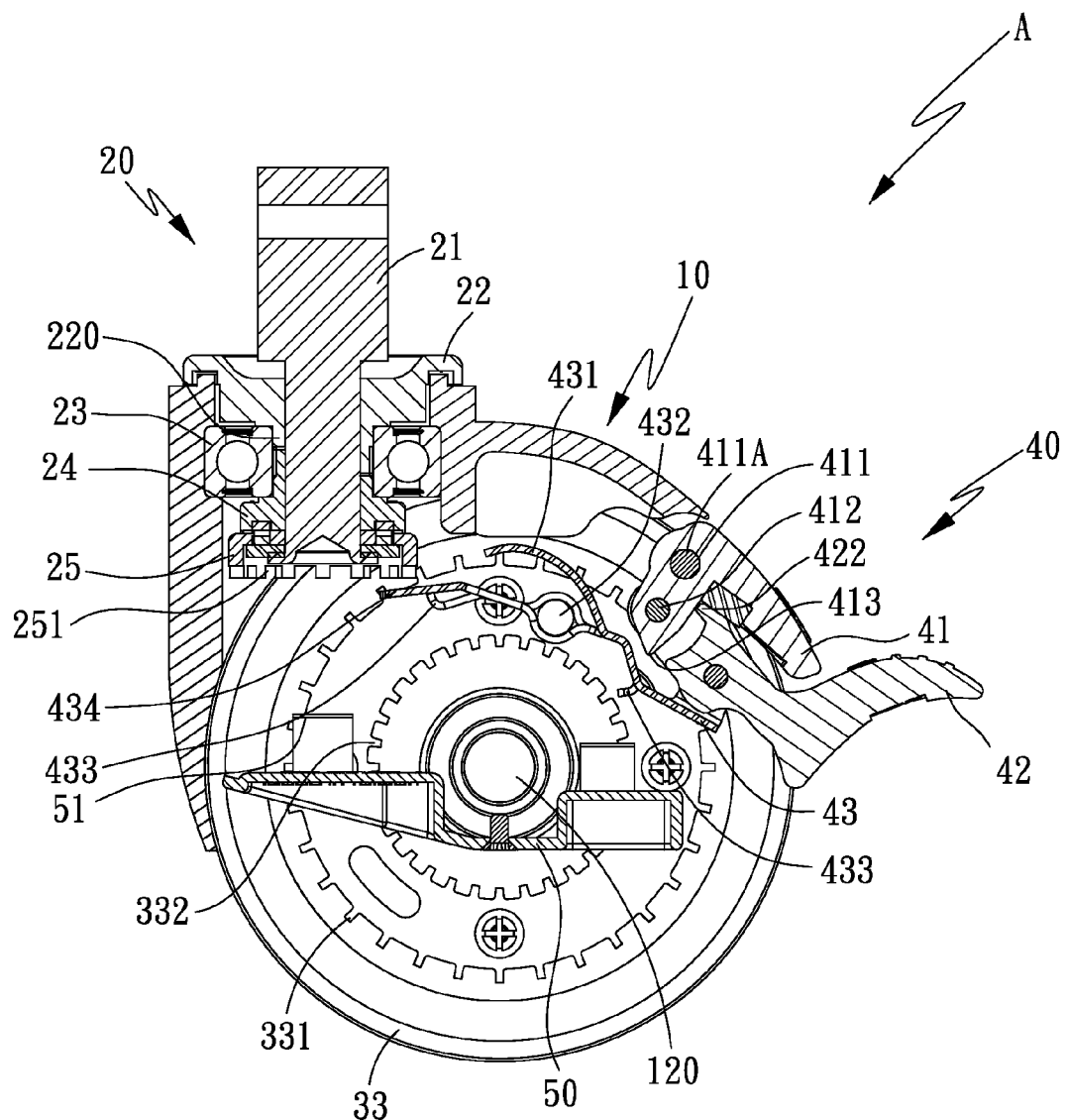
FIG. 3 is a cross sectional view of the double-pedal double-wheel truckle with independent braking and releasing functions in accordance with the present invention.

When the releasing member 41 is stepped down, as shown in FIGS. 1-3, the releasing portion 410 of the releasing member 41 will be pressed against the matching body 12, and the actuating member 42 will rotate around the coupling holes 420B, making the actuating portion 421 tilt upward. At this moment, the abutting engaging portions 433, the abutting fastening portion 434 and the abutting locking portions 435 are disengaged from the engaging portions 331, the locking portion 332 and the fastening portion 251, so that the truckle body device 30 is in a brake-release state and free to rotate.

Figure 4:
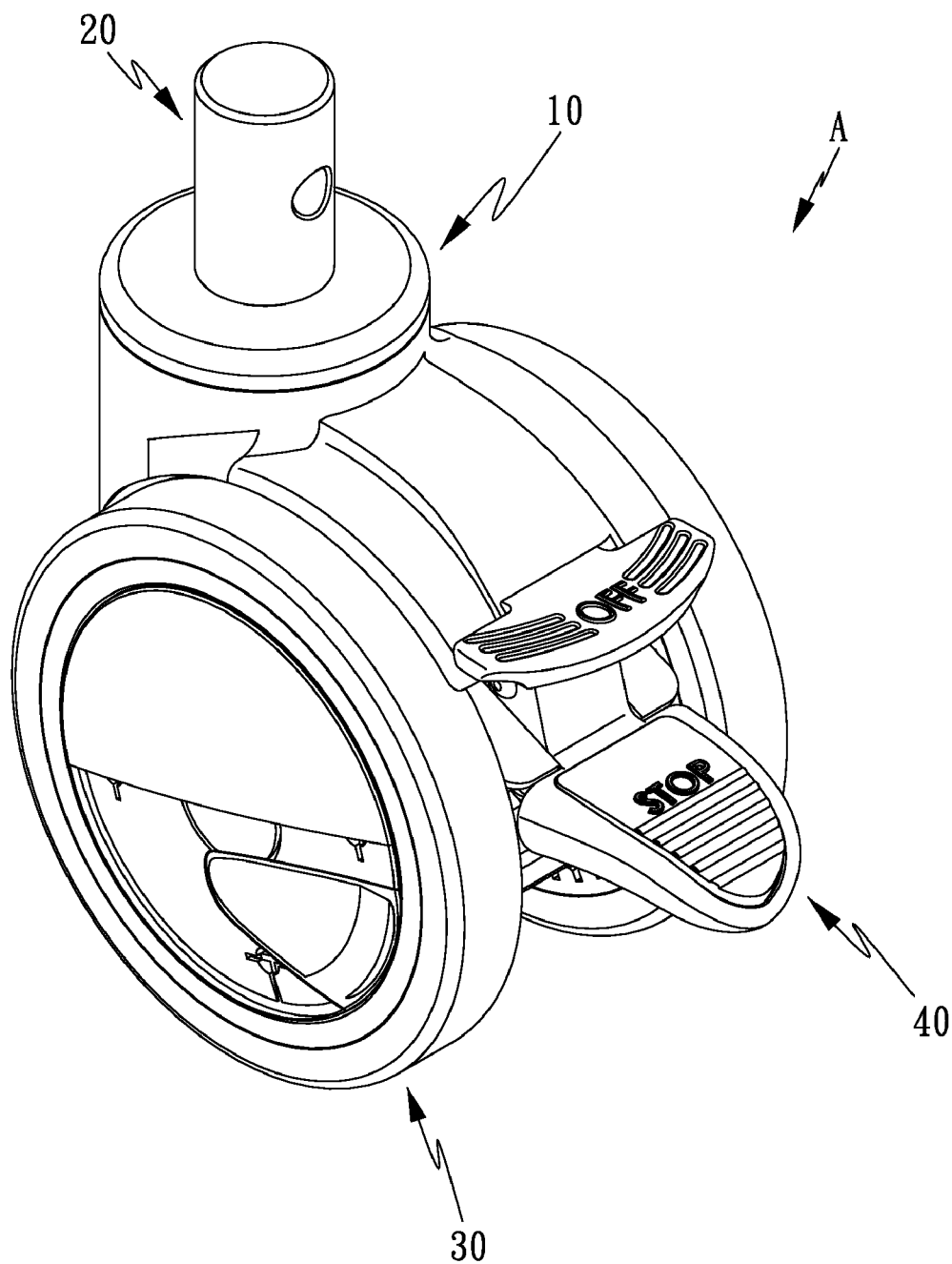
FIG. 4 is a perspective view showing that the double-pedal double-wheel truckle with independent braking and releasing functions in accordance with the present invention is operated.
Figure 5:
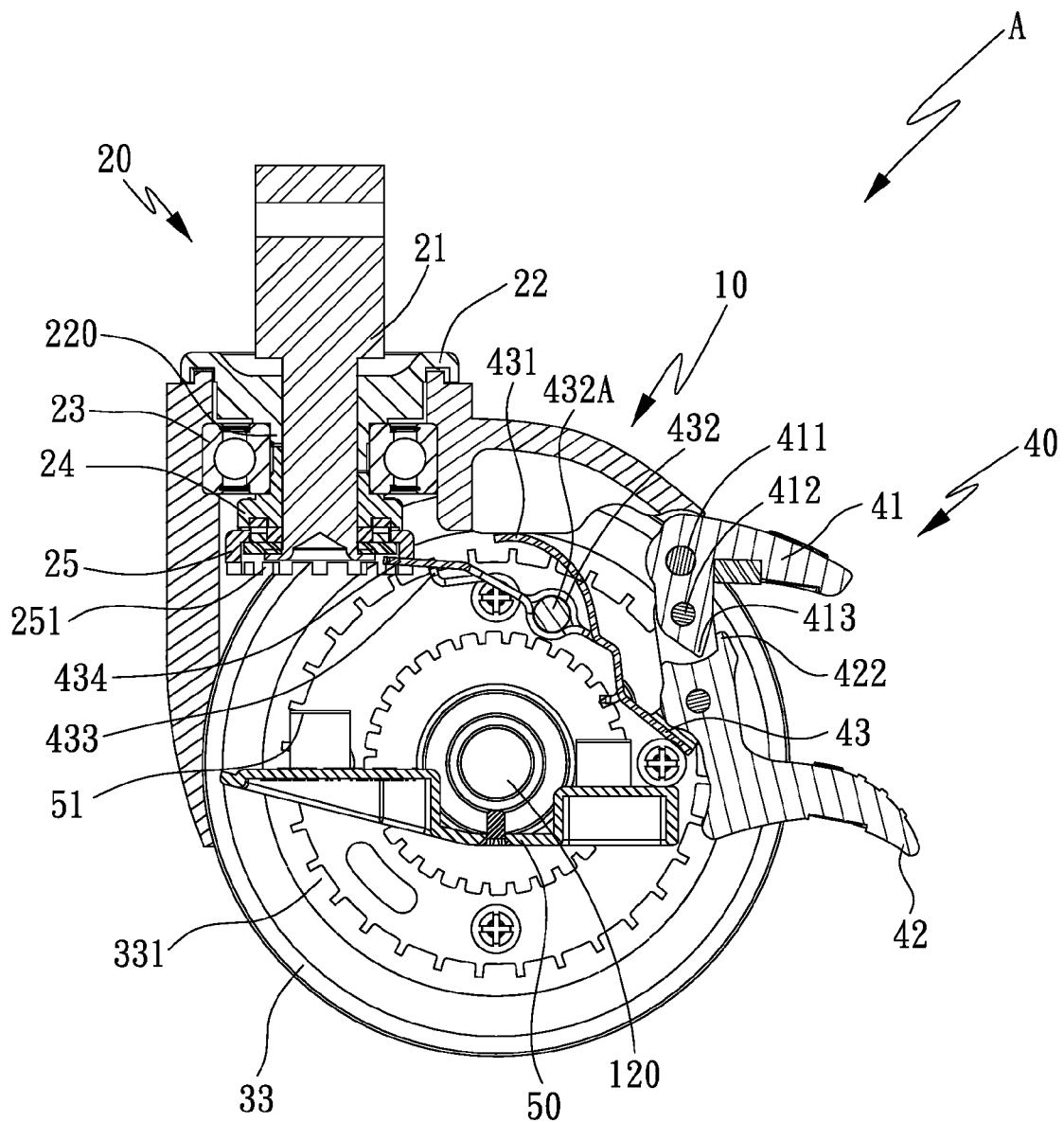
FIG. 5 is a cross sectional view showing the double-pedal double-wheel truckle with independent braking and releasing functions in accordance with the present invention is operated.

Further referring to FIGS. 4-5, when the actuating member 42 of the braking device 40 is stepped down, the actuating member 42 will rotate around the coupling holes 420B to move the releasing member 41 and the releasing & stopping member 43, and as a result, the abutting engaging portion 433 of the releasing & stopping member 43 will engage with the engaging portion 331 of the driven member 33 of the truckle body device 30, the abutting fastening portion 434 will engage with the fastening portion 251 of the fastening member 25 of the rotating & locking device 20, and the abutting locking portion 435 will engage with the locking portions 332. By such arrangements, the braking device 40 is maintained in a brake state to prevent the truckle body device 30 from rotation. The releasing member 41 and the actuating member 42 of the braking device 40 are separated when in use, meanwhile, the stop portion 413 of the releasing member 41 and the stop portion 422 of the actuating member 42 are engaged with each other, making it easier for the user to distinguish whether the braking device 40 is in a brake state or not.

While we have shown and described various embodiments in accordance with the present invention, it is clear to those skilled in the art that further embodiments may be made without departing from the scope of the present invention.

What is claimed is:

1. A double-pedal double-wheel truckle with independent braking and releasing functions suitable for a precision instrument, comprising: a body, a rotating & locking device, a truckle body device, and a braking device; wherein:
    the body is provided with a receiving portion and a matching body;
        the rotating & locking device includes a fastening member which is disposed at one end of the body and configured to be engaged with the braking device;
        the truckle body device is disposed at both sides of the body for engaging with the braking device, the truckle body device includes at least one pair of round shell members, at least one pair of wheels, at least one pair of disc-shaped multi-level driven members, at least one pair of round bearing members and a solid column-shaped middle shaft, each of the shell members is vertically formed with at least one round protruding engaging portion with a cross groove, the protruding engaging portions are disposed in the driven members, the wheels are rotatably mounted on the driven members, each of the driven members includes a plurality of engaging holes for engaging with the protruding engaging portions of the shell members, a plurality of toothed engaging portions formed on an inner surface of each of the driven members, and a plurality of locking portions formed on an outer periphery of a protruding flange around a central hole of each of the driven members, the bearing members are located at both sides of the matching body and positioned in the driven members, the middle shaft is inserted through the matching body and the bearing members;
        the braking device includes a releasing member, an actuating member, and a releasing & stopping member, the releasing member is pivotally coupled to the body, and one end of the releasing member extends out of the body and is formed with a releasing portion, the actuating member has a first end pivoted to the releasing member, a second end of the actuating member extends out of the body and is formed with an actuating portion, the first end of the actuating member pivoted to the releasing member is coupled to the releasing & stopping member, the releasing & stopping member is pivotally coupled to the body and includes two opposite ear-shaped matching portions with a round hole, an arc-shaped elastic return member is formed on an elastic sheet portion between the two matching portions and protrudes in an opposite direction to the matching portions, two fastening portions are formed at both sides of the elastic sheet portion, both sides of the elastic sheet portion extend in an opposite direction to the matching portions to form two hook-shaped abutting engaging portions, a middle portion of the elastic sheet portion extends in an opposite direction to the matching portions to form an abutting fastening portion, at each of two sides of the elastic sheet portion is formed an abutting locking portion which extends in an opposite direction to the matching portions, a pivot shaft is inserted through matching portions and the actuating member, and the elastic return member is disposed in the middle of the abutting fastening portion to press against an inner surface of the matching body, a pivot rod is inserted in the fastening portions of the releasing & stopping member and through holes of the matching body;
    when the actuating member of the braking device is stepped down, the abutting engaging portions, the abutting fastening portion and the abutting locking portions will be engaged with the engaging portions and the locking portion of the driven member of the truckle body device and the fastening portion of the fastening member of the rotating & locking device, respectively, so as to prevent the truckle body device from rotation;
    when the releasing member is stepped down, the abutting engaging portions, the abutting fastening portion and the abutting locking portions will be disengaged from the engaging portions, the locking portion and the fastening portion, so that the truckle body device is free to rotate.

2. The double-pedal double-wheel truckle with independent braking and releasing functions as claimed in claim 1, wherein the matching body is formed with a plurality of fastening holes for fastening a bottom cover body.

3. The double-pedal double-wheel truckle with independent braking and releasing functions as claimed in claim 1, wherein the rotating & locking device includes an inserting member, a matching member, a bearing member, at least one washer member, and the fastening member, one end of the inserting member is inserted through the matching member, the bearing member, the washer member and the fastening member, the matching member covers the receiving portion and is formed with an inserting portion, inserted through the bearing member, which is disposed in the receiving portion of the body the washer member is disposed between the fastening member and the bearing member, and the fastening member is formed with a receiving hole for insertion of the inserting member, and a fastening portion for engaging with the braking device.

* * * * *